United States Patent

Heal et al.

[15] 3,698,709

[45] Oct. 17, 1972

[54] DOCUMENT HANDLING APPARATUS

[72] Inventors: David Heal; James D. Parks, both of Iowa City, Iowa

[73] Assignee: Westinghouse Learning Corporation, Iowa City, Iowa

[22] Filed: Jan. 4, 1971

[21] Appl. No.: 103,415

[52] U.S. Cl. ....................................271/88, 214/6 N
[51] Int. Cl. ............................................B65h 31/10
[58] Field of Search......271/86, 74 R, 68, 74 PG, 63, 271/71, 87, 88; 214/6 N; 93/93 K

[56] References Cited

UNITED STATES PATENTS

| | | | |
|---|---|---|---|
| 3,578,159 | 5/1971 | Lindquist et al. | 271/87 X |
| 3,447,695 | 6/1969 | Krepp et al. | 214/6 N |
| 3,355,166 | 11/1967 | Plumb | 271/74 X |
| 3,378,256 | 4/1968 | Ellis et al. | 271/68 |
| 2,551,685 | 5/1951 | McAleer et al. | 93/93 K |

*Primary Examiner*—Evon C. Blunk
*Assistant Examiner*—Bruce H. Stoner, Jr.
*Attorney*—Haven E. Simmons and James C. Nemmers

[57] ABSTRACT

A system for offsetting the position of a selected document in a stack of similar documents as the selected document is fed into the stack. The system can be used in any apparatus where documents are serially conveyed into a stack forming mechanism for the purpose of identifying the offset document from others in the stack. The apparatus uses vacuum shoes to stop the documents in either the offset or a normal stack position, the former being used for those documents selected for identification. The vacuum shoes are also used as a stack height sensing means to control the customary vertically movable table supporting the stack.

7 Claims, 3 Drawing Figures

INVENTORS
DAVID HEAL
JAMES D. PARKS
BY James C. Nemmers
ATTORNEY

INVENTORS
DAVID HEAL
JAMES D. PARKS
BY James C. Nemmers
ATTORNEY

DOCUMENT HANDLING APPARATUS

BACKGROUND OF THE INVENTION

The invention relates to sheet or document handling apparatus which serves to stack serially fed documents of the same size and in the order in which they are fed into the stack. More particularly, the invention relates to document stacking apparatus in which selected documents are offset in the direction of travel of the document for purposes of identifying the preselected documents from the other documents in the stack.

Document stackers are widely used in all types of machines in which cards, sheets or other documents are handled. Normally, such machines are part of a data processing system in which groups of documents are fed from an input hopper, are processed and are then stacked in an output hopper either in the same or an inverse order from that in the input hopper. In such data processing systems, and particularly in such systems where the documents are "read," it is often desirable to be able to quickly identify selected documents without the necessity of manually going through a stack of several hundred such documents. In document readers, for example, it is generally desirable to identify so-called "command" or "header" sheets which precede sets of documents of different types which may require different processing. Another application is in the area of printing presses where it is sometimes desirable to identify certain groups or sets of documents or to readily identify a fixed number of sheets in each group or set. The prior art discloses machines which eject documents transversely of their path of travel into a separate stack. This method of segregating documents has very limited use since it cannot be used in those applications where "command" or "header" sheets must remain in the stack in order to segregate the preceding or following group of documents. In fact, in most types of document processing or handling it is not only desirable but essential that all the documents remain as a part of the original stack and in the same order that they existed in the original stack from which they were fed. In the copending U.S. patent application, Ser. No. 800,110 entitled Document Handling Apparatus and in which Everett F. Lindquist and George E. Carsner are the inventors (now U.S. Pat. No. 3,578,159) there is disclosed an offset document stacker in which the selected documents are permitted to travel a limited distance beyond the leading edge of the stack. This is accomplished by a movable stop which upon receipt of an appropriate signal is moved out of the way to permit the selected document to pass beyond the leading edge of the normal stack until it strikes a fixed stop. The method and apparatus disclosed in said U.S. Pat. No. 3,578,159 works extremely well in most cases but has some limitations. For example, the entire force of the moving document is absorbed by its leading edge in order to position the document in a stack. Normally, this is not a problem, but some documents may have their leading edge damaged which can lead to jamming in data processing equipment used subsequently. Also, because the basic apparatus disclosed in said U.S. Pat. No. 3,578,159 is an electro-mechanical one, its speed of operation is limited. Furthermore, with the electro-mechanical arrangement disclosed in U.S. Pat. No. 3,578,159 the selected documents must always be offset from the leading edge of the stack. There are situations and applications where it is desirable to be able to offset the documents to either the leading or trailing edge of the stack.

SUMMARY OF THE INVENTION

Our invention provides an improved offset document stacking apparatus which allows documents selected for identification to be offset either from the leading edge of the stack or its trailing edge whichever is preferable in the particular application. Also, our novel offset stacking arrangement uses vacuum shoes to stop the document travel, thus practically eliminating any possibility of damage to the document. The vacuum system can be operated at much higher speeds than prior art systems and also permits the incorporation of the stack height sensing mechanism into the offset mechanism thus eliminating the total number of components necessary for the stacking operation. This reduces the initial cost and also minimizes maintenance of the stacking apparatus. Also, our novel apparatus can be used for documents of varying size without the necessity of time consuming adjustments. Our novel apparatus thus provides a greatly improved system which can be used in a much wider variety of applications and at a lesser cost than known prior art apparatus.

BRIEF DESCRIPTION OF THE DRAWINGS

The objects, features and advantages of the invention will become apparent from the description of the preferred embodiment herein taken in connection with the drawings in which.

DESCRIPTION OF THE PREFERRED EMBODIMENT

Figure 1:
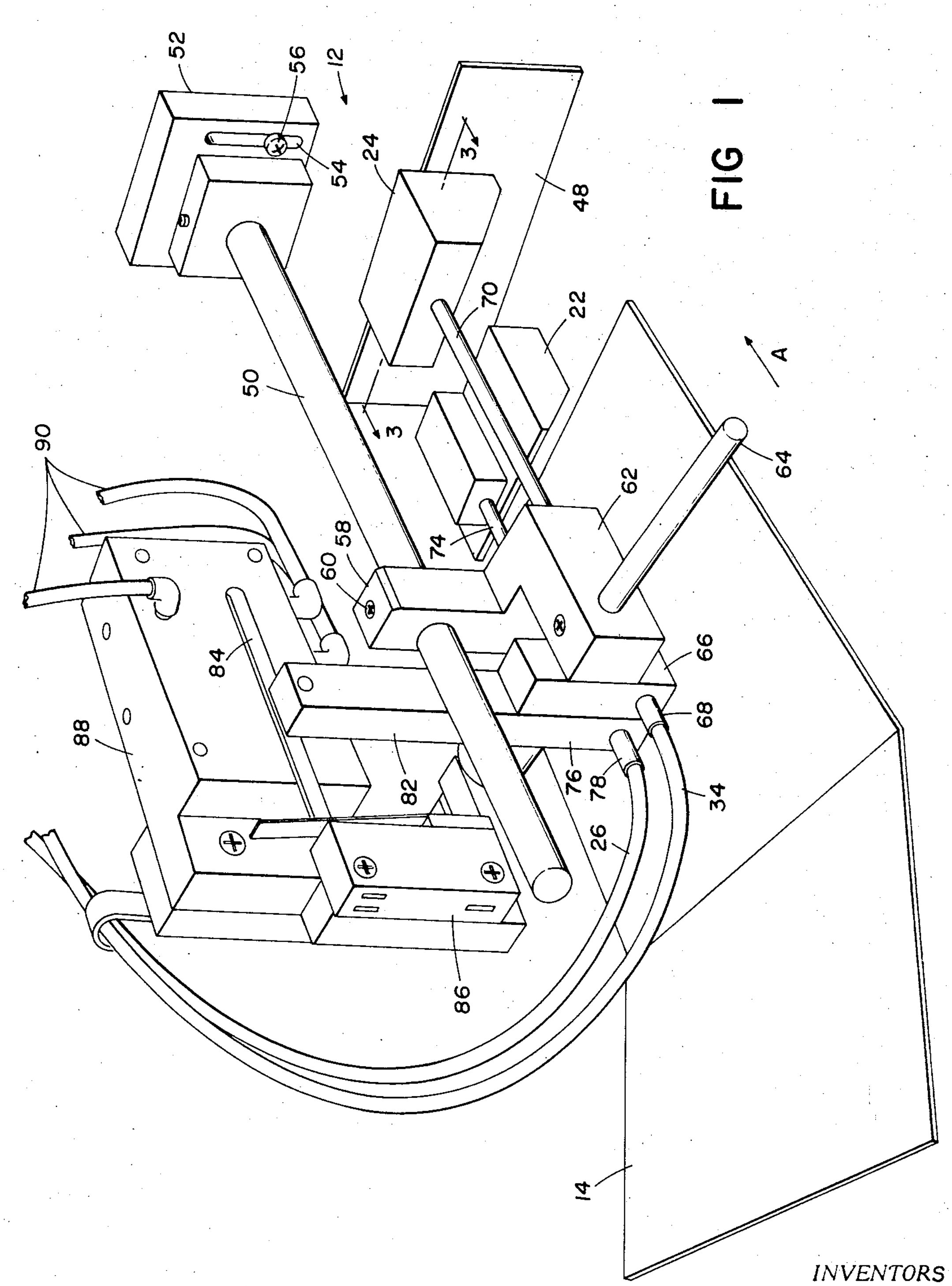
FIG. 1 is a perspective view of the offset stacking mechanism of our invention.

As is well known to those skilled in the art, document stackers of the type to which our invention relates are located at the downstream end of a document reader or other data processing machine. The documents are conveyed through the machine in any suitable manner, usually by drive and idler wheels 10 which are all mechanically interconnected and, therefore, driven at precisely the same speed in order to maintain the accurate timing required in apparatus of this type. As a document approaches the output stacking mechanism, indicated generally by the reference numeral 12, it will pass beneath the document guide plate 14 and onto the top surface of the document stack support table 16. (FIG. 2) The document will also be guided and prevented from transverse movement by suitable side guide plates or rails (not shown). As the document moves on to the top of the stack, the document will leave the positive control of the last set of drive wheels 10, having sufficient velocity to carry it completely onto the supporting table 16.

Figure 2:
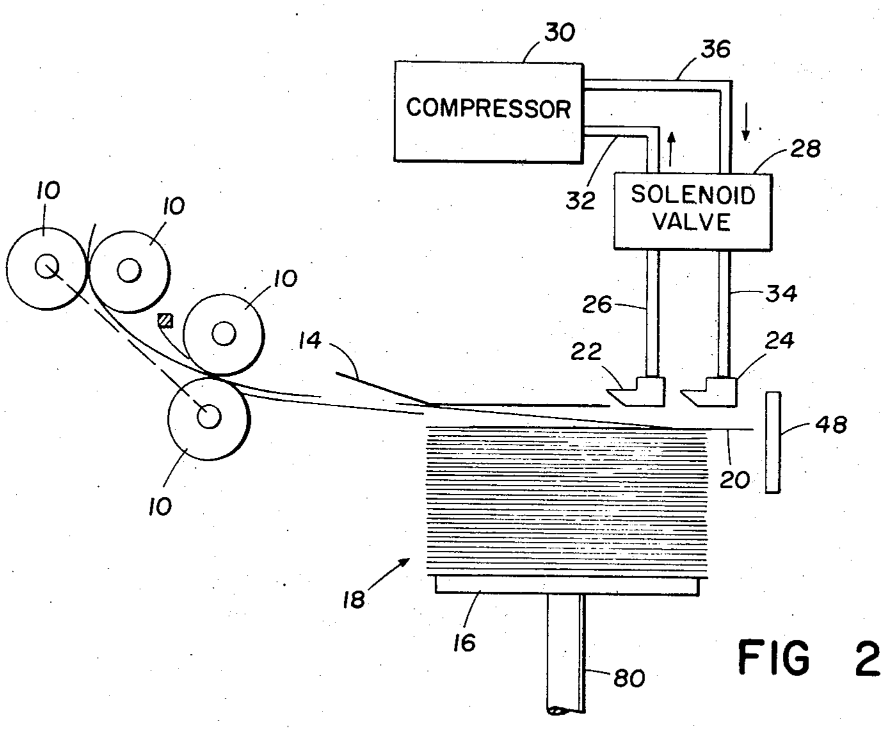
FIG. 2 is a fragmentary side elevation view of a portion of the offset stacking mechanism diagramatically illustrating the vacuum system for offsetting a document.
Figure 3:
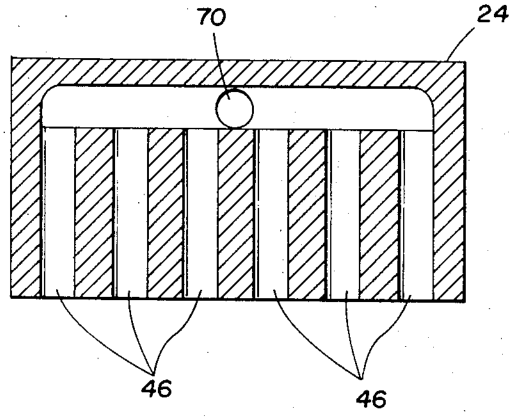
FIG. 3 is a sectional view taken on the lines 3 — 3 of FIG. 1 and illustrating in part the construction of a typical vacuum shoe used in the system.

FIG. 2 diagramatically shows the system for offsetting documents which are selected for identification to either the leading or trailing edge of the document stack. As shown in FIG. 2, the normal document stack is indicated by the reference numeral 18, and a document 20 is shown as offset from the leading or downstream edge of the stack (to the right of FIG. 2). The operation of offsetting the documents downstream will be described first. The documents moving into the stacking station are stopped either in the normal stacking position of stack 18 or in the offset position of document 20 depending upon whether vacuum is applied to upstream shoe 22 or downstream shoe 24. Each shoe 22 and 24 is provided with a plurality of orifices along its bottom surface, such as orifices 46 shown in FIG. 3. The system for applying a vacuum to one or the other of shoes 22 or 24 is illustrated in FIG. 2. Shoe 22 is connected by line 26 to a solenoid valve 28 which in turn is connected to the vacuum side of compressor 30 by line 32. Shoe 24 is connected by line 34 to the solenoid valve 28 which is connected to the high pressure side of compressor 30 by line 36. Solenoid valve 28 may be of any suitable type which has a movable operator, the position of which is responsive to an electronic signal from a command source. (not shown) Valve 28 must be of a type which in one stacking mode will interconnect line 26 to the vacuum side of compressor 30 through line 32 while connecting line 34 to the high pressure side through line 36. In the other stacking mode position, valve 28 will interconnect lines 34 and 32 and interconnect lines 26 and 36. Thus, with the system set to offset documents downstream and with valve 28 in the normal stacking mode position, pump 30 will draw air up through orifices in shoe 22 since lines 26 and 32 are interconnected by solenoid valve 28. On the high side of pump 30, the air will pass through line 36 and down through line 34 and be exhausted through orifices 46 in shoe 24. The vacuum thus produced at the bottom surface of shoe 22 will stop an incoming document in the normal stacking position. When a document is to be offset from the normal stacking position, an appropriate command signal will be given by a control means (not shown). The system and control means for giving the appropriate command signal does not form a part of this invention: a typical system application is described in U.S. patent application Ser. No. 800,110 filed by Everett F. Lindquist and George E. Carsner entitled Document Handling Apparatus. When the appropriate command signal is given, the operator of solenoid valve 28 will respond and move to the offset mode position. This will interconnect lines 34 and 32 and simultaneously will interconnect line 26 with line 36. In the offset mode, air will then be drawn through orifices 46 in shoe 24 up through line 34 and discharged on the high side of pump 30 into the atmosphere through lines 36 and 26. A vacuum will be, therefore, produced along the bottom surface of shoe 24 and an incoming document to be offset will then continue past shoe 22 and will be stopped by shoe 24. As a failsafe feature, a suitable mechanical stop 48 may also be used if desired. The system will remain in the offset mode only a sufficient length of time to stop the particular document to be offset. The system may be returned to the normal stacking mode in any suitable manner such as by an electronic timing device (not shown) which will give an appropriate signal to solenoid valve 28 to return its operator to the normal stacking mode position.

At times, it may be desirable or necessary to offset documents so that the trailing edges of the offset documents extend upstream from normal stack 18. The only modification in the system of FIG. 2 that is required so that the system will operate to offset the document to the left of FIG. 2 rather than to the right is to modify the control or command signal given to valve 28. In other words, for offsetting documents upstream the normal stacking mode now produces a vacuum along the bottom surface of shoe 24 and the documents will bypass shoe 22 and be stopped by shoe 24. In the normal stacking mode for offsetting documents upstream with the system of FIG. 2 the air will be exhausted through the orifices in the upstream shoe 22. This flow of air assists each document in sliding downstream (to the right of FIG. 2) where it will be stopped by the vacuum produced by downstream shoe 24. When in the offsetting mode, however, the operator of solenoid 28 will be moved by the appropriate electronic signal to interconnect upstream shoe 22 with the vacuum line 32 and to connect downstream shoe 24 with the high pressure line 36 of compressor 30. Thus, the vacuum will be produced at the bottom surface of the upstream shoe 22 and the air from the high pressure side of pump 30 will be discharged through shoe 24. When this occurs, the document will be stopped with its trailing edge extending upstream (to the left of FIG. 2) and thus be offset from the normal stack 18. Circuitry for producing properly timed command signals to operate solenoid 28 to change from the normal to the offset mode, etc., do not form a part of our invention. One such system is disclosed in U.S. Ser. No. 800,110 previously referred to herein.

The unique mounting of the shoes 22 and 24 which makes our novel system an extremely workable one for almost any size or type of document is shown in FIG. 1. The offset stacking mechanism is supported on a horizontal rod 50 which extends in the direction of document travel (Arrow A) and is affixed to a mounting block 52 that is adapted to be removably and adjustably secured to a stationary portion of the machine (not shown) in connection with which the stacking mechanism 12 is used. To provide for height adjustability of the mechanism 12, the mounting block 52 may be provided with slots 54 through which extend mounting screws 56. A main support member 58 is slidably and turnably mounted at the outer end of rod 50 so that the position of the entire mechanism 12 can be positioned at the desired point along the axis of rod 50 depending on the length and type of document being handled. A set screw 60 or other suitable means can be used to hold the relative position of the support member 58 and rod 50. Support member 58 has a horizontally extending arm 62 through which there extends a rod 64 positioned transversely of the direction of travel of the document. Rod 64 is turnable and slidable along its axis to provide for adjustability of the stacking mechanism in a direction transverse to document travel. Mounted on rod 64 for limited pivotal movement about its axis is a supporting block 66 containing a fitting 68 adapted to receive the air line 34 leading to solenoid valve 28. Extending forwardly or upstream from supporting block 66 is a hollow rigid rod 70 at the outer end of which there is affixed the downstream shoe 24. Rod 70 is hollow and the interior of rod 70 communicates with the fitting 68 to which air line 34 is connected. Thus, rod 70 provides a passageway for air flow to or from orifices 46 in the shoe 24. Rod 70 also provides for limited turning of the rod 70 about its axis within the supporting block 66. Thus, the mounting of downstream shoe 24 allows the shoe 24 to adapt to any variations in the level of the stack 18, and the bottom surface of shoe 24 is able to conform to a document moving onto the top of stack 18 thus assuring that there will be sufficient engagement so that the vacuum (if vacuum is being applied) will be sufficient to stop further movement of the document.

Upstream shoe 22 is similarly mounted on a hollow rod 74 which in turn is turnably mounted in a supporting block 76 mounted on rod 64 for limited pivotal movement with respect thereto. The hollow interior of rod 74 communicates with fitting 78 at the upstream side of supporting block 76, which fitting 78 is in turn connected to air line 26.

With the unique mounting of the shoes 22 and 24 and with the multiple axis adjustability provided by the mounting of the supporting rods 50 and 64, it will be evident that the stacking mechanism 12 can be adjusted so it can be used with almost any type or size of document. Also, as previously described, by merely modifying the command signal to the solenoid valve 28 the same stacking mechanism 12 can be used to offset documents either upstream or downstream from the normal stack. In some applications, it might be necessary to counter balance the weight of the two shoes 22 and 24, and if so, the guide plate 14 can be affixed to and supported by the blocks 66 and 76. Since the guide plate 14 extends upstream, the weight of the plate may be sufficient to counter balance the two shoes 22 and 24. If not, more weight can be added at the appropriate place along the upper surface of the guide plate 14.

Customarily, an incoming document is fed on top of the preceding document of the stack 18. Therefore, the top surface of the stack 18 must be maintained at a relatively constant height. As is well known to those skilled in the art, this is commonly done by mounting the stack support table 16 on a vertical rod 80 which is connected directly to a hydraulic or pneumatic cylinder or to an electronically driven worm-gear arrangement which will raise and lower the support table 16 through an infinite number of positions. For example, since air is generally available in connection with data processing systems such as document readers, the compressor 30 can be used to create a vacuum for the stacking shoes 22 and 24 and also to provide air to the cylinder (not shown) which moves the stack support table 16 up and down. As is well known to those skilled in the art, there is also provided a stack height sensing member which through an appropriate control system will control movement of the stack support table either up or down depending on the signal received from the stack height sensing means. Our novel stacking mechanism easily lends itself to serving the dual function of not only stopping the documents in the normal or offset position but also providing the stack height sensing function. Since the vertical movement of shoes 22 and 24 will follow any change in the height of stack 18, this movement can be used to control proportional movement of the stack support table 16. For example, small variations in movement of a shoe can be detected by a photo sensor (not shown) the output of which can then be amplified and used to start, stop and reverse a motor in an electrically driven worm-gear arrangement that controls movement of table 16. In FIG, 1 there is shown an arrangement by which this stack height sensing function can be easily accomplished where a pneumatic cylinder is used to control movement of the stack support table 16. By extending the supporting block for one of the shoes 22 or 24 upwardly, pivotal movement of the shoe and supporting block about the rod 64 can be utilized to control the height of the stack support table 16. In FIG. 1, we have shown the supporting block 76 for the upstream shoe 22 as being extended upwardly to provide an operating arm 82. Although we have shown the operating arm as being controlled by the upstream shoe 22, the same function could be performed by extending upwardly the supporting block 66. However, since shoe 22 will be in engagement with the top of stack 18 regardless of which direction the documents are offset it is preferable to use the pivotal movement of shoe 22 rather than that of shoe 24. The operating arm 82 is connected to the control arm 84 for a limit switch 86 which in turn controls the operation of a height sense valve 88. Limit switch 86 and height sense valve 88 can be supported on an extension of the rod 64 as indicated in FIG. 1. The height sense valve 88 will have one or more air lines 90 leading to the pneumatic cylinder (not shown) which controls the upward and downward movement of the stack support table 16. The number of lines and the specific operation of the height sense valve are within the capability of those skilled in the art and further details of a specific system do not form a part of our invention. From the foregoing description, however, it will be evident that as the height of stack 18 increases, the top level of the stack will move upwardly. Since the shoes 22 and 24 rest on the top of the stack, both shoes, and particularly shoe 22, will gradually move upwardly and cause the operating arm 82 to pivot about rod 64. When sufficient pivotal movement of operating arm 82 has occurred, and this amount of movement can be adjusted, the limit switch 86 will be actuated to operate height sense valve 88 and cause the stack support table 16 to move downwardly. As the table 16 moves downwardly and the top of stack 18 is lowered accordingly, shoe 22 will follow the downward movement and cause the operating arm 82 to pivot in the opposite direction. Pivotal movement of the operating arm 82 will again operate the limit switch 86 controlling height sense valve 88 to decrease or stop the air flow to the cylinder operating the table 16.

With our novel stacking mechanism, we have provided not only simplicity and thus ease of maintenance but flexibility to offset stacking of documents. The independent suspension mounting of each of the shoes 22 and 24 will assure positive stopping of each document whether the system is operating in the normal stacking mode or the offset mode. The system also provides the dual function of independent sensing of stack height and thus eliminates the normal components which might otherwise have to be provided to carry out this function. Because there is normally no mechanical stop for the documents, damage to the lead edge of each document is eliminated. Since documents often travel at a very hight rate of speed, this is an important feature. Prior art systems using a mechanical stop also sometimes cause rebounding of the documents thus resulting in inadvertent offsetting. The vacuum shoes 22 and 24 assure positive stopping of the documents at the precise place without the possibility of damage. Because our novel system has few moving parts which move slowly within limited distances, maintenance of the system is practically eliminated. Long life is thus assured and this is important where hundreds of thousands of documents are being processed through a piece of equipment.

Having thus described our invention, it will be obvious to those skilled in the art that various revisions and modifications can be made to the preferred embodiment disclosed herein without departing from the spirit and scope of the invention. It is our intention, however, that all such revisions and modifications as are obvious to those skilled in the art will be included within the scope of the following claims.

We claim:

1. In a document handling apparatus for handling documents which have rectangular shaped flat parallel opposed surfaces that terminate in thin peripheral edges, and in which said apparatus has document conveying means for controllably moving documents individually along a defined path through said apparatus, means for identifying selected ones of documents handled by said apparatus and formed into a stack of documents comprising, stacking means at the end of said path for forming a stack of documents with their leading and trailing edges normally substantially aligned, said stacking means including vacuum gripping means the suction effect of which grips one of the said surfaces of the document to stop movement of the document when it is in a position with its edges aligned with the other documents forming the stack, offsetting means combined with said stacking means for causing selected documents to come to rest in said stack with their leading and trailing edges out of alignment with the normal alignment of the documents forming said stack, said offsetting means including vacuum gripping means, the suction effect of which grips one of the said surfaces of the document to stop movement of the document when in the desired position within said stack, and control means selectively controlling the application of vacuum to one or the other of said vacuum gripping means.

2. In the document handling apparatus of claim 1 in which said vacuum gripping means include a pair of vacuum shoes, one shoe being located downstream from the other shoe in the direction of document travel.

3. In the document handling apparatus of claim 2 in which said vacuum shoes are each mounted for limited pivotal movement so as to engage the top document in the stack of documents.

4. In the document handling apparatus of claim 3 in which said stacking means includes a stack support and a stack height control means to provide for movement of said stack support up and down so as to maintain the top of said document stack at substantially the same level at all times.

5. In the document handling apparatus of claim 4 in which said stack height control means is one of said vacuum shoes, and means responsive to vertical movement of the said vacuum shoe controls movement of said stack support up and down.

6. In the document handling apparatus of claim 3 in which there is provided a main support for supporting said vacuum shoes, said main support providing for adjustable vertical movement of said shoes and also for adjustable movement of said shoes in the direction of document travel, and a secondary support for said vacuum shoes, said secondary support providing for adjustable movement of said shoes transversely to the direction of document travel.

7. In the document handling apparatus of claim 2, in which said control means includes a control valve, and said vacuum shoes are connected to said control valve thereby controlling the application of vacuum to one or the other of said shoes.

* * * * *